(12) United States Patent
Terauchi et al.

(10) Patent No.: US 10,550,853 B2
(45) Date of Patent: Feb. 4, 2020

(54) GAS TURBINE ENGINE

(71) Applicant: KAWASAKI JUKOGYO KABUSHIKI KAISHA, Kobe-shi, Hyogo (JP)

(72) Inventors: Koji Terauchi, Kobe (JP); Daisuke Uemura, Kobe (JP); Hiroshi Kubo, Kobe (JP); Naoto Sakai, Osaka (JP); Toshimasa Miura, Kakogawa (JP); Yuki Ishitobi, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/013,042

(22) Filed: Jun. 20, 2018

(65) Prior Publication Data

US 2018/0298917 A1    Oct. 18, 2018

Related U.S. Application Data

(63) Continuation of application No. PCT/JP2016/088290, filed on Dec. 22, 2016.

(30) Foreign Application Priority Data

Dec. 25, 2015 (JP) .................. 2015-254074

(51) Int. Cl.
   *F04D 29/54*    (2006.01)
   *F02C 3/04*    (2006.01)
   *F23R 3/46*    (2006.01)

(52) U.S. Cl.
   CPC .............. *F04D 29/541* (2013.01); *F02C 3/04* (2013.01); *F23R 3/46* (2013.01); *F05D 2220/32* (2013.01);
   (Continued)

(58) Field of Classification Search
   CPC .... F02C 3/04; F23R 3/46; F04D 29/54; F04D 29/541; F04D 29/545; F04D 29/547;
   (Continued)

(56) References Cited

U.S. PATENT DOCUMENTS 2,582,809 A * 1/1952 Weir .................. F02K 7/16
                                                    60/263
4,081,957 A * 4/1978 Cox, Jr. .................... F23R 3/14
                                                    60/737
(Continued)

FOREIGN PATENT DOCUMENTS

JP    2011-236897 A    11/2011
JP    2012-062900 A    3/2012

OTHER PUBLICATIONS

International Search Report for PCT/JP2016/088290 dated Mar. 14, 2017 [PCT/ISA/210].

*Primary Examiner* — Ehud Gartenberg
*Assistant Examiner* — Jacek Lisowski
(74) *Attorney, Agent, or Firm* — Sughrue Mion, PLLC (57) ABSTRACT

A gas turbine engine, in which a compressed gas from a compressor of an axial-flow type is burned in a combustor and an obtained combustion gas drives a turbine, includes: a diffuser of an annular shape connected to an outlet of the compressor, the diffuser including a diffuser inner tube and a diffuser outer tube that are tubular members disposed concentrically with each other; and a plurality of partition members that are disposed in a diffuser flow path, which is an annular space formed between the diffuser inner tube and the diffuser outer tube, and divide the diffuser flow path in a circumferential direction.

9 Claims, 6 Drawing Sheets

(52) U.S. Cl.
CPC .... *F05D 2240/128* (2013.01); *F05D 2240/35* (2013.01)

(58) Field of Classification Search
CPC ...... F04D 29/44; F04D 29/444; F04D 29/542; F04D 29/544; F05D 220/32; F05D 2240/128; F05D 2240/35
See application file for complete search history.

(56) References Cited

U.S. PATENT DOCUMENTS

| | | | | |
|---|---|---|---|---|
| 4,373,327 | A * | 2/1983 | Adkins | F23R 3/10 60/39.37 |
| 5,704,211 | A * | 1/1998 | Hatfield | F01D 9/045 415/208.2 |
| 9,574,575 | B2 * | 2/2017 | Graves | F04D 29/547 |
| 2010/0242487 | A1 * | 9/2010 | Davis, Jr. | F01D 9/023 60/772 |
| 2011/0271654 | A1 | 11/2011 | Siden | |
| 2014/0260289 | A1 * | 9/2014 | Graves | F04D 29/547 60/772 |
| 2015/0047358 | A1 * | 2/2015 | Schott | F02C 3/14 60/726 |
| 2018/0195722 | A1 * | 7/2018 | Schott | F01D 9/023 |

* cited by examiner

GAS TURBINE ENGINE

CROSS REFERENCE TO THE RELATED APPLICATION

This application is a continuation application, under 35 U.S.C. § 111(a), of international application No. PCT/JP2016/088290, filed Dec. 22, 2016, which claims priority to Japanese patent application No. 2015-254074, filed Dec. 25, 2015, the disclosure of which are incorporated by reference in their entirety into this application.

BACKGROUND OF THE INVENTION

Field of the Invention

The present invention relates to a gas turbine engine, and particularly to the structure of a diffuser which guides compressed air from a compressor to a combustor.

Description of Related Art

Generally, in a gas turbine engine, a diffuser is provided at an outlet of an axial-flow compressor, whereby static pressure of compressed air is recovered, and pressure loss (mainly, dynamic pressure loss) until the compressed air flows into a combustor is reduced (refer to Patent Document 1, for example). In the axial-flow compressor, the volumetric flow rate of a gas to be compressed decreases along the flow direction of the gas. Therefore, generally, the flow-path height in the compressor gradually decreases toward the downstream direction, and the wetted-perimeter length with respect to the cross-sectional area of the flow path at the outlet of the compressor increases along with the decrease in the flow-path height.

RELATED DOCUMENT

Patent Document

[Patent Document 1] JP Laid-open Patent Publication No. 2012-062900

SUMMARY OF THE INVENTION

According thereto, also in the diffuser connected to the outlet of the compressor, the flow-path height thereof is small, and the wetted-perimeter length thereof with respect to the cross-sectional area of the flow path is large. Generally, it has been known that the larger the wetted-perimeter of the flow path is, the greater the friction loss due to the wall surface of the flow path is. Therefore, it is considered that, if the wetted-perimeter length of the flow path can be decreased in the diffuser of the compressor, the pressure loss caused by the friction loss due to the wall surface of the flow path can be reduced.

In order to solve the above-described problem, an object of the present invention is to provide a gas turbine engine capable of reducing, with a simple structure, friction loss due to the wall surface of a diffuser of a compressor.

In order to attain the above-described object, a gas turbine engine according to the present invention is a gas turbine engine in which a compressed gas from a compressor of an axial-flow type is burned in a combustor and an obtained combustion gas drives a turbine. The gas turbine engine includes: a diffuser of an annular shape connected to an outlet of the compressor, the diffuser including a diffuser inner tube and a diffuser outer tube which are tubular members disposed concentrically with each other; and a plurality of partition members that are disposed in a diffuser flow path, which is an annular space formed between the diffuser inner tube and the diffuser outer tube, and divide the diffuser flow path in a circumferential direction.

According to this configuration, by adopting the simple structure in which the diffuser flow path is provided with the partition members, the wetted-perimeter length (flow-path surface area) of the diffuser can be reduced. Thus, the friction loss due to the wall surface of the diffuser flow path can be sufficiently reduced without greatly changing the dimension of the existing diffuser.

In one embodiment of the present invention, each of the partition members may have such a shape that a circumferential dimension thereof gradually increases from an upstream side toward a downstream side in a flow direction of the compressed gas. According to this configuration, the friction loss due to the wall surface of the diffuser flow path can be reduced while suppressing the pressure loss caused by the partition members provided in the diffuser flow path.

In one embodiment of the present invention, an aspect ratio $H/W$ of a height dimension $H$ relative to a width dimension $W$ of a flow-path cross section of each of divided diffuser flow paths which are formed by dividing the diffuser flow path with the partition members may be larger at an outlet of the divided diffuser flow path than at an inlet of the divided diffuser flow path, and the aspect ratio of the flow-path cross section at the outlet of the divided diffuser flow path may be within a range of 0.3 to 5. According to this configuration, the friction loss due to the wall surface of the diffuser flow path can be reduced while suppressing an increase in the dimension of the diffuser and ensuring a necessary flow-path area for the diffuser.

In one embodiment of the present invention, the aspect ratio of the flow-path cross section at the outlet of the divided diffuser flow path may be 1. According to this configuration, at the outlet of the divided diffuser flow path, the wetted-perimeter length with respect to the flow-path area can be minimized.

In one embodiment of the present invention, the gas turbine engine may further include a connection column that connects the diffuser outer tube to the diffuser inner tube, and the connection column may be disposed only at a circumferential position identical with a circumferential position of the partition member. The partition member may also serve as the connection column. According to this configuration, since a structure such as the connection column is not disposed downstream of the outlet of the divided diffuser flow path, the pressure loss is suppressed which is caused when the compressed gas flowing from the diffuser toward the combustor collides against the connection column.

In one embodiment of the present invention, the partition member may be disposed radially inward of the combustor. A plurality of the combustors may be disposed in the circumferential direction. Assuming that the number of the combustors is N and the number of the partition members is n, N/n is preferably a natural number. According to this configuration, the compressed gas is divided in the circumferential direction by each partition member, at a position radially inward of the corresponding combustor. Therefore, the compressed gas discharged from the diffuser can be uniformly supplied to a plurality of spaces between the respective combustors.

In one embodiment of the present invention, a length of the partition member in the flow direction may be equal to or greater than 10% of a length of the diffuser in the flow direction.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment according to the present invention will be described with reference to the drawings. However, the present invention is not limited to the embodiment.

Figure 1:
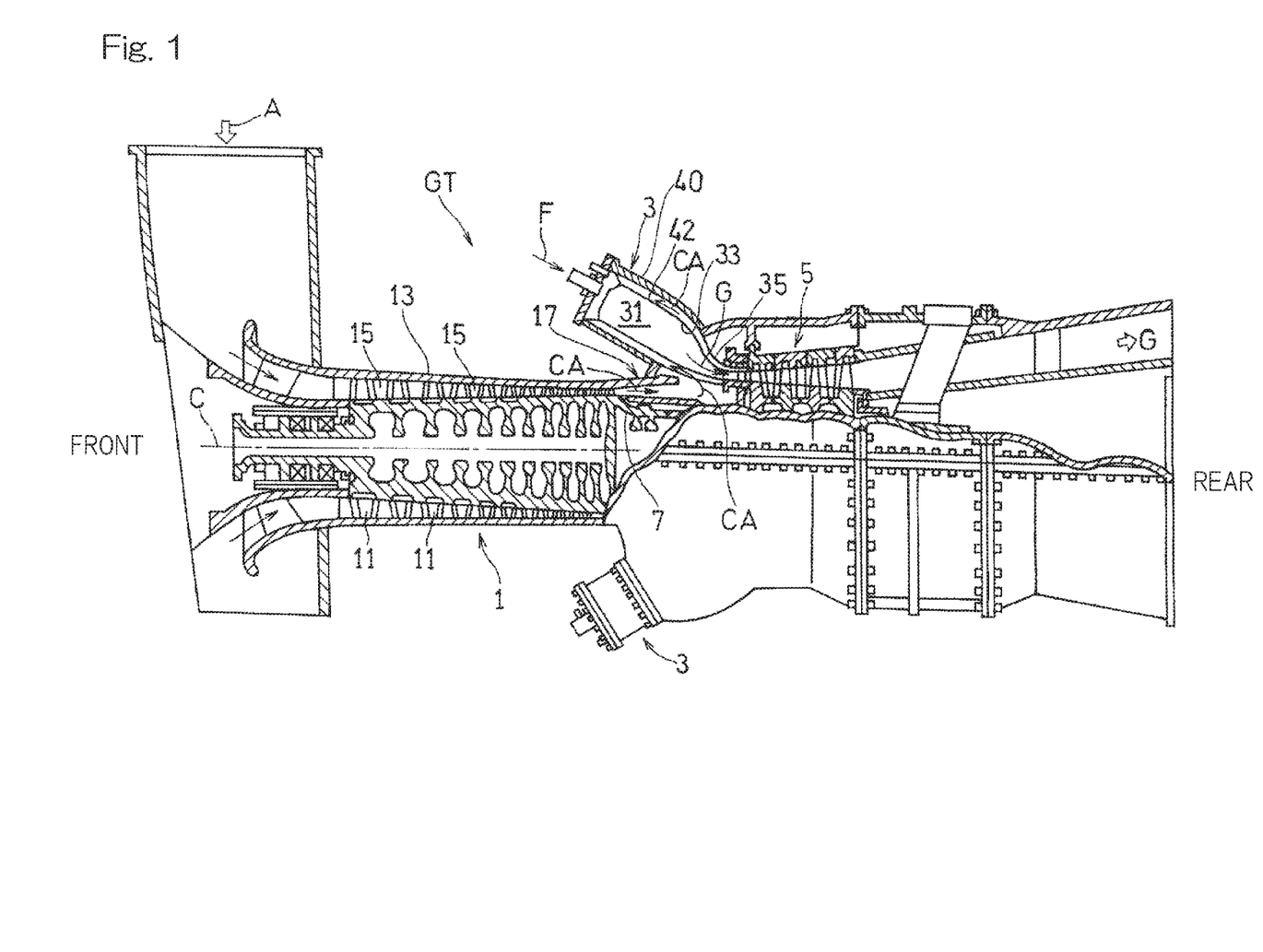
FIG. 1 is a partially cut-away side view showing a schematic structure of a gas turbine engine according to an embodiment of the present invention.

FIG. 1 is a partially cut-away side view of a gas turbine engine (hereinafter simply referred to as "gas turbine") GT according to one embodiment of the present invention. In the gas turbine GT, an air A introduced from the outside is compressed by a compressor 1 and guided to a combustor 3, a fuel F is burned together with the compressed air CA in the combustor 3, and a turbine 5 is driven by using the obtained high temperature and high pressure combustion gas G. In the present embodiment, a plurality of can-type combustors 3 are arranged at equal intervals along the circumferential direction of the gas turbine GT. In the description below, the compressor 1 side in the axis C direction of the gas turbine GT may be referred to as "front side", and the turbine 5 side in the axis C direction of the gas turbine GT may be referred to as "rear side". The terms "front" and "rear" included in the names of elements constituting the embodiment have the same meanings. In addition, in the description below, the terms "axial direction", "circumferential direction", and "radial direction" respectively mean the axis C direction, the circumferential direction, and the radial direction of the gas turbine GT, unless otherwise specified.

Figure 2:
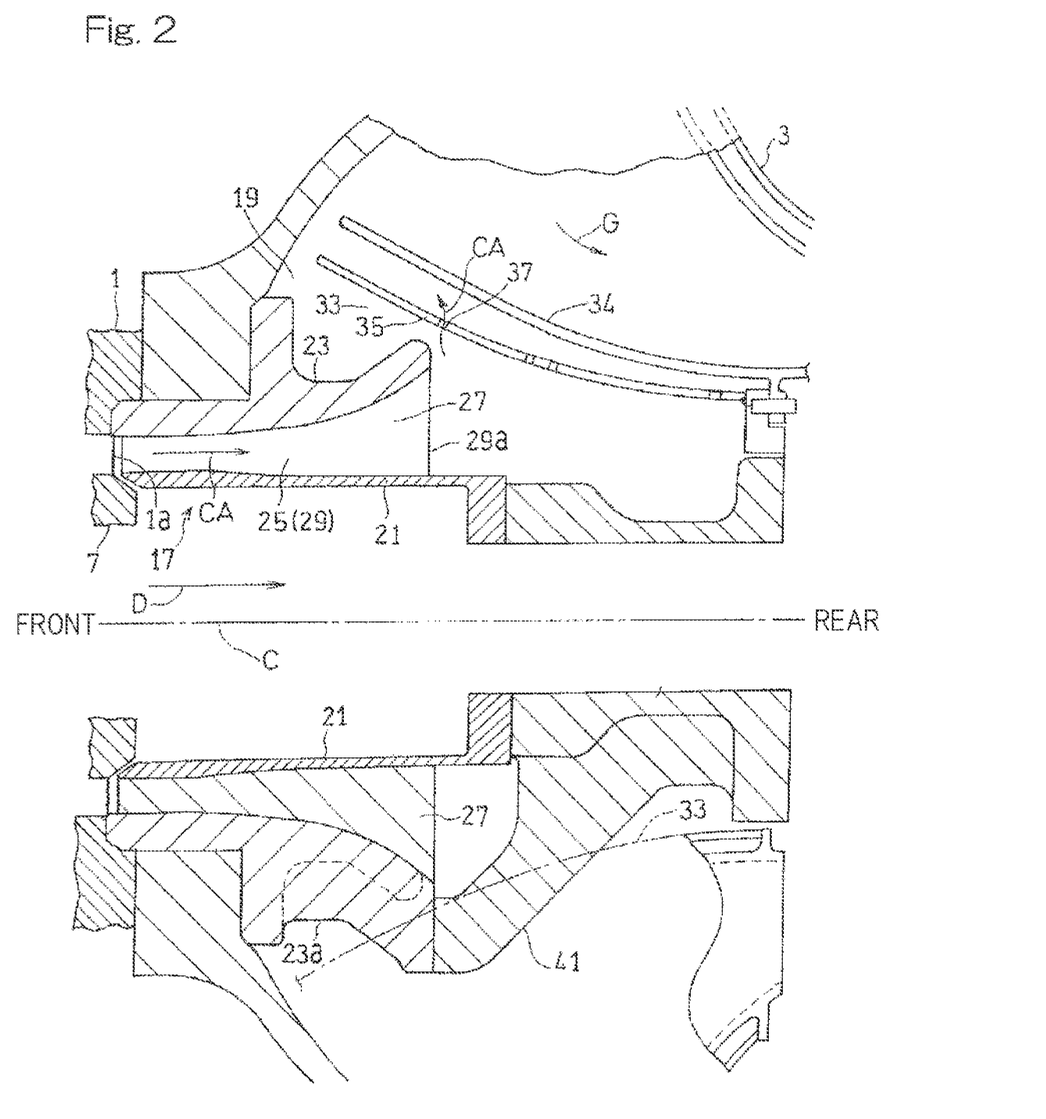
FIG. 2 is a longitudinal sectional view showing, in an enlarged manner, a peripheral portion of a diffuser of the gas turbine engine shown in FIG. 1.

In the present embodiment, a compressor of an axial flow type is used as the compressor 1. The axial-flow compressor 1 compresses the air A taken from the outside, by using a combination of: multiple rotor blades 11 disposed on an outer peripheral surface of a rotor 7 forming a rotary part of the gas turbine GT; and multiple stator blades 15 disposed on an inner peripheral surface of a housing 13. As shown in FIG. 2, the compressed air CA generated in the compressor 1 is supplied to the combustor 3 through a diffuser 17 connected to a downstream end portion of the compressor 1 and through a chamber 19 located downstream of the diffuser 17. The chamber 19 is a substantially annular space, and a plurality of the combustors 3 are disposed in the annular space so as to be spaced apart from each other in the circumferential direction.

The diffuser 17 guides the compressed air CA discharged from an outlet 1a of the compressor 1, toward the rear side in the axial direction. The diffuser 17 includes a flow path having a flow-path area gradually increasing from an inlet of the diffuser 17, which is connected to the compressor outlet 1a, toward the rear side. The compressed air CA discharged from the compressor outlet 1a passes through the diffuser 17, whereby the static pressure thereof is recovered.

In the present embodiment, the diffuser 17 includes two tubular members disposed concentrically with each other, i.e., a diffuser inner tube 21 and a diffuser outer tube 23. The diffuser inner tube 21 forms an inner diameter side wall of the diffuser 17, and the diffuser outer tube 23 disposed radially outward of the diffuser inner tube 21 forms an outer diameter side wall of the diffuser 17. An annular space formed between the diffuser inner tube 21 and the diffuser outer tube 23 is a diffuser flow path 25 through which the compressed air CA flows. The inner diameter side wall formed by the diffuser inner tube 21 separates the diffuser 17 from an accommodation space for the components (e.g., the rotor 7) of the gas turbine GT disposed radially inward of the diffuser 17.

Figure 3:
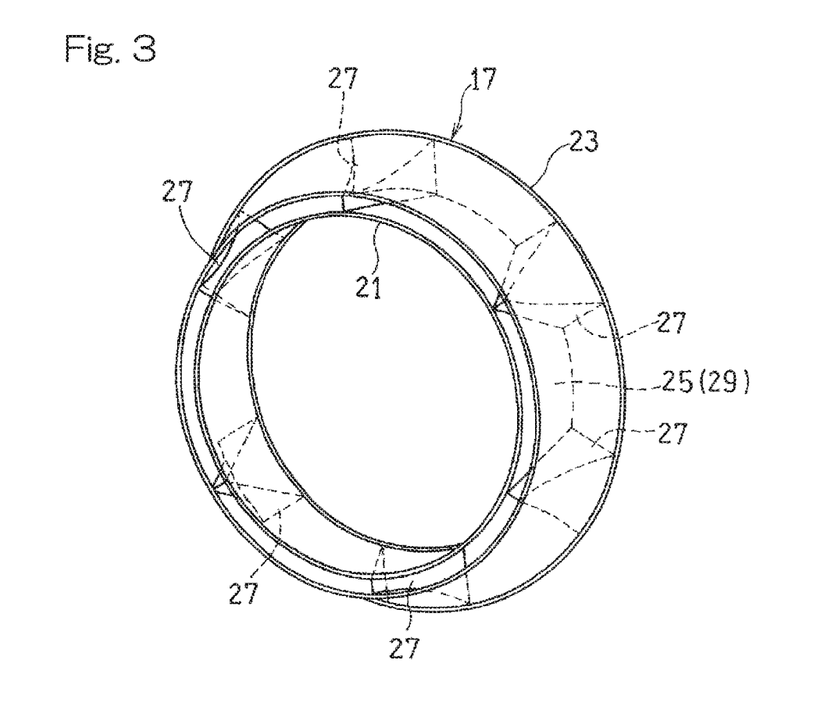
FIG. 3 is a perspective view showing a schematic structure of the diffuser used in the gas turbine engine shown in FIG. 1.

As shown in FIG. 3, the diffuser 17 is provided with a plurality of (six in this example) partition members 27 that divide the diffuser flow path 25 in the circumferential direction. The plurality of partition members 27 are disposed at equal intervals in the circumferential direction. Hereinafter, each of the flow paths formed by dividing the diffuser flow path 25 with the partition members 27 is referred to as a divided diffuser flow path 29.

In the present embodiment, as shown in FIG. 2, each partition member 27 is provided so as to extend over the entire length of the diffuser 17 in the flow direction D of the compressed air CA (hereinafter simply referred to as "flow direction D"). However, the partition member 27 is not necessarily provided over the entire length of the diffuser 17 in the flow direction D. The length of the partition member 27 is preferably equal to or greater than 10% of the entire length of the diffuser 17 in the flow direction D, and more preferably equal to or greater than 20% thereof. In FIG. 2, for the sake of convenience of description, a cross section of a circumferential position where the partition member 27 is absent (that is, a circumferential position where the divided diffuser flow path 29 is formed) is shown on the upper side of the axial line C of the gas turbine GT, while a cross section of a circumferential position where the partition member 27 is present is shown on the lower side of the axial line C.

In the present embodiment, the total flow-path surface area of the diffuser 17 is set to be smaller than the flow-path surface area of the diffuser 17 in the case where the partition members 27 are absent, by providing the plurality of partition members 27 as described above in the diffuser 17. The flow-path surface area means the surface area of the wall surface that defines the flow path. The total flow-path surface area of the diffuser 17 means the area obtained by totalizing the flow-path surface areas of all the divided diffuser flow paths 29 in the diffuser 17.

Figure 4:
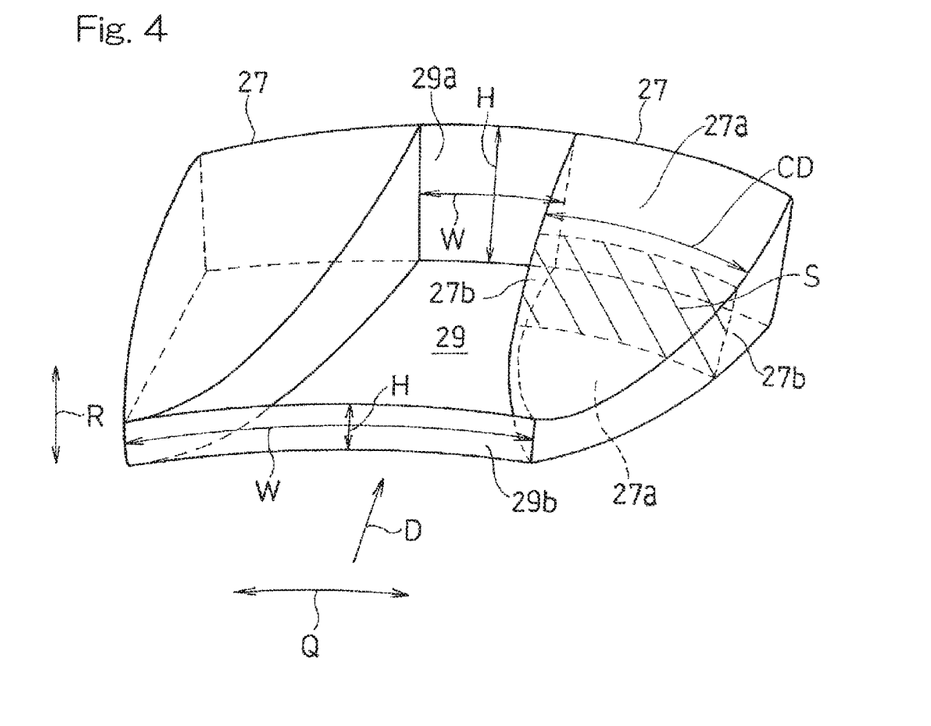
FIG. 4 is a perspective view showing schematic structures of a partition member and a divided diffuser flow path of the diffuser used in the gas turbine engine shown in FIG. 1.

The "flow-path surface area of the diffuser 17 in the case where the partition members 27 are absent" is a value obtained by summing up the area of the outer peripheral surface of the diffuser inner tube 21 and the area of the inner peripheral surface of the diffuser outer tube 23. Meanwhile, each divided diffuser flow path 29 is formed by: a portion of the outer peripheral surface of the diffuser inner tube 21 between adjacent partition members 27, 27; a portion of the inner peripheral surface of the diffuser outer tube 23 between the adjacent partition members 27, 27; and the side surfaces of the adjacent partition members 27, 27. Therefore, the "total flow-path surface area of the diffuser 17" is a value obtained by subtracting, from the value obtained by summing up the area of the outer peripheral surface of the diffuser inner tube 21 and the area of the inner peripheral surface of the diffuser outer tube 23, the areas of contact surfaces of the diffuser inner tube 21 and the diffuser outer tube 23 with the partition members 27, and then adding the areas of the side surfaces of the partition members 27 which are side wall surfaces of the divided diffuser flow paths 29. Accordingly, each partition member 27 employed in the present embodiment is formed in such a shape that the total area of opposite side surfaces 27b, 27b facing in the circumferential direction in FIG. 4 is smaller than the total area of opposite bottom surfaces 27a, 27a facing in the radial direction in FIG. 4 which are the aforementioned contact surfaces.

In the case of setting the total flow-path surface area of the diffuser 17 to be smaller than the flow-path surface area of the diffuser 17 in the case where the partition members 27 are absent as described above, it is preferable that, for example, a desired static pressure recovery ratio with respect to the diffuser 17 is maintained to be equal to or higher than that in the case where the partition members 27 are not provided. That is, in the present embodiment, the total flow-path surface area of the diffuser 17 is set to be smaller than the flow-path surface area of the diffuser 17 in the case where the partition members 27 are absent, while the flow-path area ratio of the inlet of the diffuser 17 to the outlet thereof, which determines the static pressure recovery ratio, is maintained to be equal to or more than that in the case where the partition members 27 are absent.

In the present embodiment, each partition member 27 has such a shape that a cross-sectional area (sectional area taken along a plane orthogonal to the axial direction) S thereof increases along the flow direction D (that is, from the front side toward the rear side). Further, in this example, the partition member 27 has such a shape that a circumferential dimension CD thereof gradually increases from the upstream side toward the downstream side in the flow direction D. More specifically, a sectional shape of the partition member 27 taken along a generating line of the flow path has a bullet shape having an apex at the upstream side in the flow direction D, that is, a shape in which opposite sides extending gradually apart from each other from the apex on the upstream side toward the downstream side are curved so as to swell outward.

Figure 7:
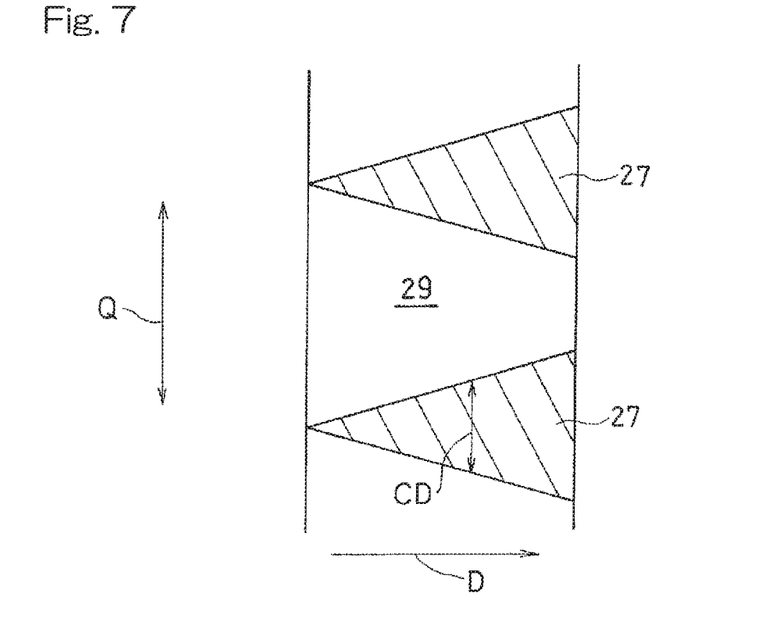
FIG. 7 is a sectional view showing an example of the shape of the partition member of the diffuser used in the gas turbine engine shown in FIG. 1.
Figure 8:
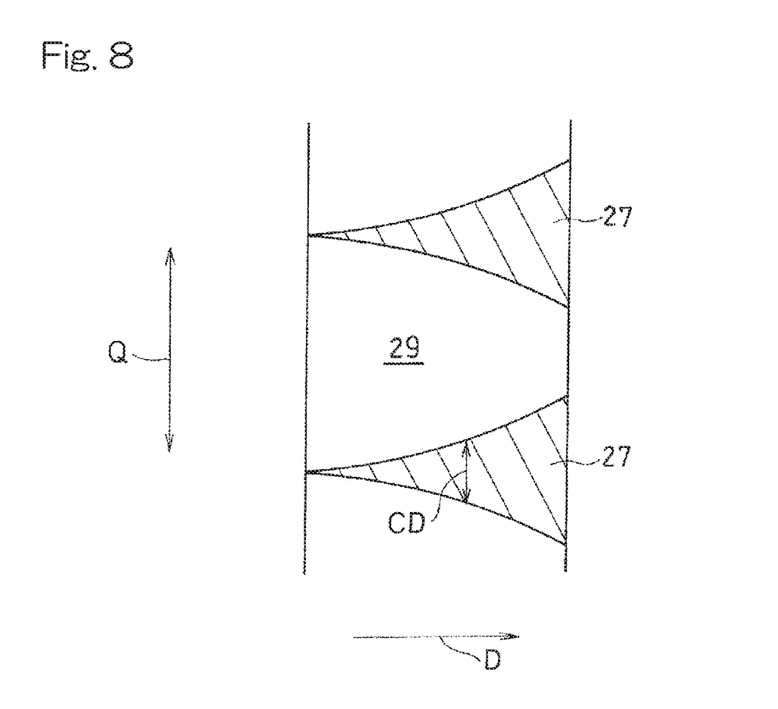
FIG. 8 is a sectional view showing an example of the shape of the partition member of the diffuser used in the gas turbine engine shown in FIG. 1.

The sectional shape of the partition member 27 along the generating line of the flow path is not limited to the bullet shape. The sectional shape of the partition member 27 along the generating line of the flow path may be, for example, as shown in FIG. 7, an isosceles triangle having an apex on the upstream side in the flow direction D, or may be, as shown in FIG. 8, a shape in which the opposite sides extending gradually apart from each other from an apex on the upstream side toward the downstream side are curved so as to be concaved inward. When the partition member 27 has such a shape that the circumferential dimension CD gradually increases from the upstream side toward the downstream side in the flow direction D, it is possible to suppress the pressure loss caused by the partition members 27 provided in the diffuser flow path 25. In particular, when the cross-sectional shape of the partition member is the bullet shape shown in FIG. 4, the total flow-path surface area of the diffuser 17 can be further reduced as compared with the examples shown in FIGS. 7 and 8.

As shown in FIG. 4, an aspect ratio H/W of a height dimension H relative to a width dimension W of the flow-path cross section of each of the divided diffuser flow paths 29 formed by the partition members 27 is set to be larger at the outlet 29a of the divided diffuser flow path 29 than at the inlet 29b of the divided diffuser flow path 29. The width dimension of the flow-path cross section, based on which the aspect ratio is calculated, is the width dimension (dimension in the circumferential direction Q) at a center position in the height direction of the flow path (radial direction R). The height dimension of the flow-path cross section, based on which the aspect ratio is calculated, is the height dimension (dimension in the radial direction R) at a center position in the width direction of the flow path (circumferential direction Q).

In other words, the partition member 27 has such a shape that not only the circumferential dimension CD thereof but also the radial dimension thereof gradually increases from the upstream side toward the downstream side in the flow direction D. The partition member 27 having such a shape allows the aspect ratio H/W of the height dimension H to the width dimension W of the flow-path cross section of the divided diffuser flow path 29 to be larger at the outlet 29a of the divided diffuser flow path 29 than at the inlet 29b of the divided diffuser flow path 29. Thus, the necessary flow-path area for the diffuser 17 is ensured.

However, if the aspect ratio at the outlet 29a of the divided diffuser flow path 29 is excessively large, the radial dimension of the diffuser 17 is increased and thus the radial dimension of the gas turbine GT is increased. From this viewpoint, specifically, the aspect ratio H/W at the outlet 29a of the divided diffuser flow path 29 is preferably within a range of 0.3 to 5, and more preferably within a range of 0.4 to 3.

Figure 5:
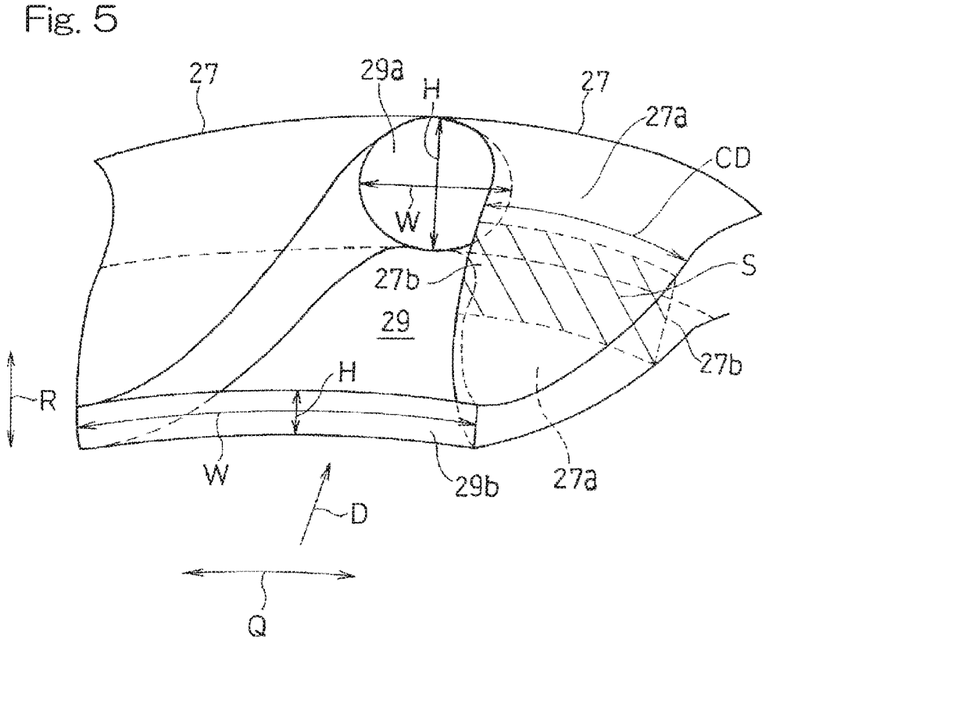
FIG. 5 is a perspective view showing another example of the partition member and the divided diffuser flow path shown in FIG. 4.
Figure 6:
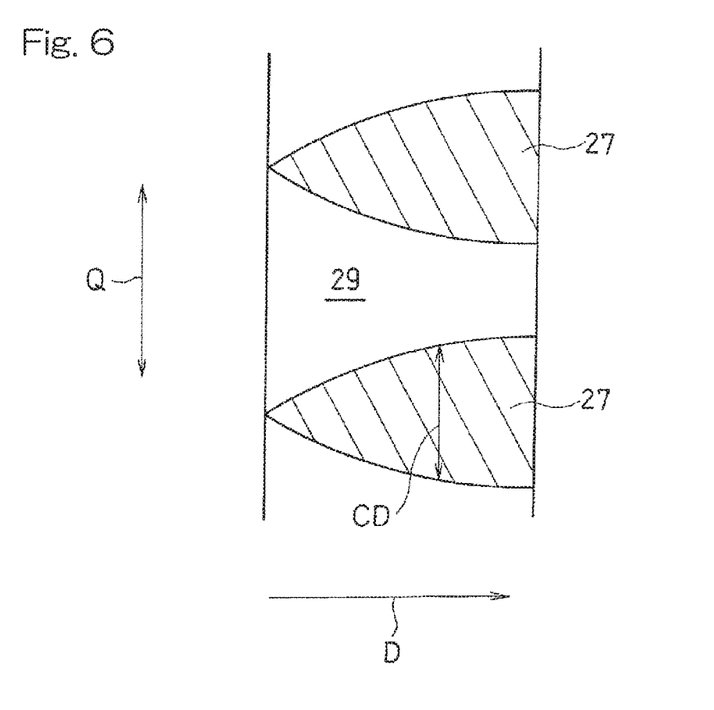
FIG. 6 is a sectional view showing an example of the shape of the partition member of the diffuser used in the gas turbine engine shown in FIG. 1.

Furthermore, in order to reduce, as much as possible, the wetted-perimeter length at the outlet 29a of the divided diffuser flow path 29 with respect to the flow-path area at the outlet 29a, the aspect ratio H/W at the outlet 29a is particularly preferably 1. That is, in the case where the shape of the outlet 29a is a rectangle taking the manufacturing efficiency into account as shown in FIG. 4, the shape of the outlet 29a is preferably a square. In the case where a reduction in the wetted-perimeter length is particularly emphasized, the shape of the outlet 29a may be a circle as shown in FIG. 5. The shape of the outlet 29a is not limited to a rectangle, and may be selected as appropriate regardless of the aspect ratio. For example, the shape of the outlet 29a may be an oval, a trapezoid, or the like.

In the case where the partition member 27 is provided within a range shorter than the entire length of the diffuser 17, the positions of the "inlet 29b of the divided diffuser flow path 29" and the "outlet 29a of the divided diffuser flow path 29", based on which the aspect ratio is calculated, are positions corresponding to an upstream-side end and a downstream-side end of the partition member 27, respectively.

Figure 9:
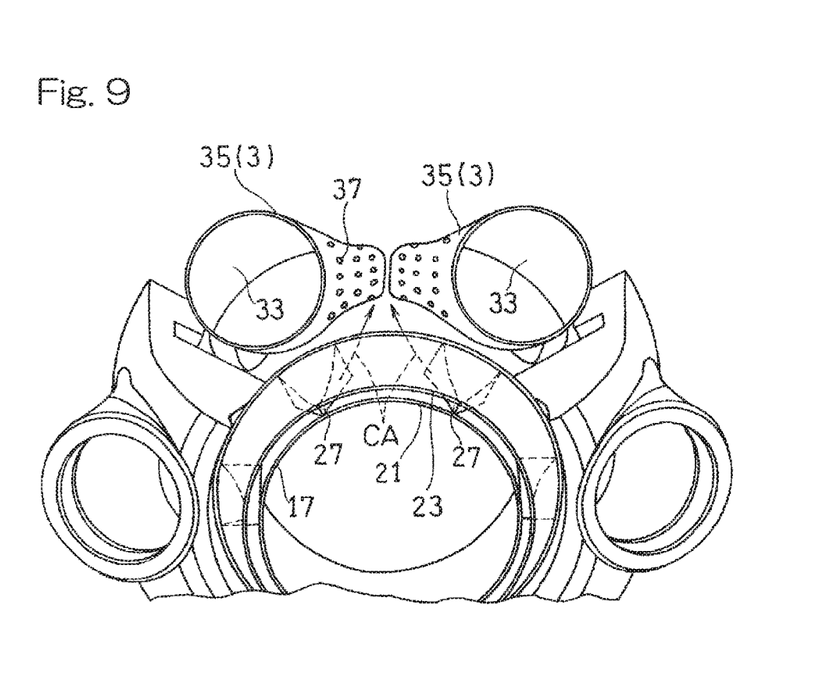
FIG. 9 is a perspective view schematically showing the positional relationship between a combustor and the diffuser in the gas turbine engine shown in FIG. 1.

As shown in FIG. 9, each partition member 27 is disposed radially inward of each of the combustors 3 disposed spaced apart from each other at equal intervals in the circumferential direction. In the present embodiment, as shown in FIG. 1, an upstream-side portion of each combustor 3 is inclined so as to project frontward and outward. In the illustrated example, each combustor 3 is a reverse flow can-type combustor, in which the compressed air CA flows toward a top portion of the combustor 3 through a flow path formed between a combustor housing 40 and a combustor liner 42 having a combustion chamber 31 formed therein. Each combustor 3 is provided with a transition duct 33 configured to lead a high-temperature combustion gas G generated in the combustion chamber 31 to the turbine 5 disposed rearward in the axial direction. As shown in FIG. 2, the transition duct 33 includes: a transition duct body 34 having a flow path for the combustion gas G formed therein; and a duct cover 35 covering the outer periphery of the transition duct body 34 via a gap. Each partition member 27 is disposed at the same circumferential position as the transition duct 33 of the corresponding combustor 3, and radially inward of the transition duct 3.

As shown in FIG. 9, multiple air introduction holes 37 for introducing the compressed air CA into the combustor 3 are formed over substantially the entire surface of the duct cover 35. That is, the duct cover 35 functions as an air introduction member for introducing the compressed air CA into the combustor 3. The compressed air introduced through the air introduction holes 37 of the duct cover 35 is also used as a cooling medium for cooling the combustor 3. Each partition member 27 is disposed at a position radially inward of the gas turbine engine such that the transition duct 33 having the above structure and the partition member 27 circumferentially and axially overlap each other.

The compressed air CA from the compressor 1 is divided in the circumferential direction in the diffuser 17, and uniformly reaches a space between adjacent combustors 3, 3 (transition ducts 33, 33). Thus, the compressed air CA can be uniformly supplied from the narrow space on the downstream side of the diffuser 17 to a plurality of spaces between the respective transition ducts 33. Since the compressed air CA flows into each combustor 3 through the multiple air introduction holes 37 formed at the surface of the corresponding transition duct 33, the flow of the compressed air CA is uniformly supplied over the entire surface of the transition duct 33 and introduced into the combustor 3, whereby the pressure loss can be reduced extremely effectively.

Figure 10:
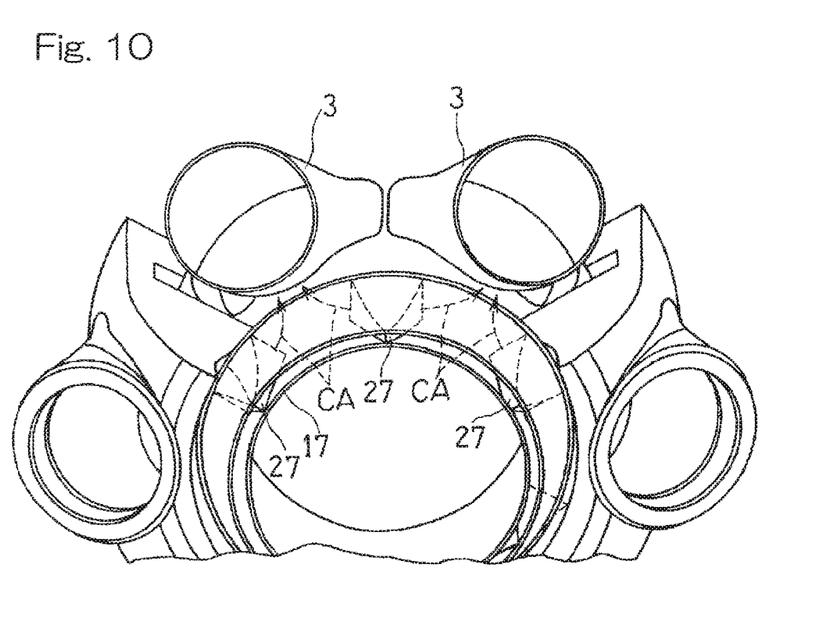
FIG. 10 is a perspective view schematically showing the positional relationship between the combustor and the diffuser in a modification of the gas turbine engine shown in FIG. 1.

However, depending on the structure of the combustor 3, there are cases where the efficiency of the gas turbine engine as a whole can be improved owing to the cooling effect of the compressed air CA by causing the compressed air CA from the diffuser 17 to collide against a radially inner portion of the combustor 3. In this case, as shown in a modification of FIG. 10, each partition member 27 may be disposed at a position radially inward of a circumferential position of a space between two adjacent combustors 3, 3.

In either case where the plurality of partition members 27 are disposed according to any of the aforementioned manners with respect to the positions of the plurality of combustors 3, the number (n) of the partition members 27 is equal to the number (N) of the combustors 3. Although the number (n) of the partition members 27 relative to the number (N) of the combustors 3 is not limited to this example, preferably, N/n is a natural number. Accordingly, when, for example, six combustors 3 are provided, three or two partition members 27 may be provided in the illustrated example. This configuration allows the compressed air CA discharged from the diffuser 17 to be uniformly supplied to the plurality of combustors 3 arranged in the circumferential direction.

In the present embodiment shown in FIG. 2, a connection column that connects the diffuser outer tube 23 to the diffuser inner tube 21 is disposed only at a circumferential position which is identical with as a circumferential position of the partition member 27. In other words, a structure for connecting the diffuser outer tube 23 to the diffuser inner tube 21 is not present at the rear side of the outlet 29a of the divided diffuser flow path 29 (at the downstream side in the axial direction). In the illustrated example, a strut 41 is provided as the connection column at the rear side of the partition member 27.

The "connection column" includes the partition member 27 in a case where the diffuser outer tube 23 and the diffuser inner tube 21 are connected to each other via only the partition member 27, no other member connecting the diffuser outer tube 23 and the diffuser inner tube 21 is provided, and the partition member 27 also serves as the "connection column". A structure such as the connection column may be disposed downstream of the outlet 29a of the divided diffuser flow path 29. However, when a structure such as the connection column is not disposed downstream of the outlet 29a of the divided diffuser flow path 29 as described above, the pressure loss is suppressed which is caused when the compressed air CA flowing from the diffuser 17 toward the combustor 3 collides against the connection column. Further, when the partition member 27 also serves as a connection column, the number of components of the gas turbine engine GT is reduced.

As described above, in the gas turbine GT according to the present embodiment, by adopting the simple structure in which the diffuser flow path 25 is provided with the partition members 27, the wetted-perimeter length (flow-path surface area) of the diffuser 17 relative to the flow-path area is reduced. Thus, the friction loss due to the wall surface of the diffuser flow path 25 can be sufficiently reduced without greatly changing the dimensions of the existing diffuser 17.

In the present embodiment, a gas turbine engine using air as a working gas is described as an example of the gas turbine GT. However, a gas turbine engine using a working gas other than air, such as carbon dioxide, is also within the scope of the present invention.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Compressor
3 . . . Combustor
5 . . . Turbine
17 . . . Diffuser
21 . . . Diffuser inner tube
23 . . . Diffuser outer tube
25 . . . Diffuser flow path
27 . . . Partition member
29 . . . Divided diffuser flow path
29a . . . Outlet of divided diffuser flow path
29b . . . Inlet of divided diffuser flow path
41 . . . Strut (Connection column)
CA . . . Compressed air (Compressed gas)
D . . . Flow direction of compressed air
GT . . . Gas turbine engine

What is claimed is:

1. A gas turbine engine in which a compressed gas from an axial-flow type compressor is burned in a combustor and an obtained combustion gas drives a turbine, the gas turbine engine comprising:
   an annular shaped diffuser connected to an outlet of the axial-flow type compressor, the annular shaped diffuser including a diffuser inner tube and a diffuser outer tube which are tubular members disposed concentrically with each other; and
   a plurality of partition members that are disposed in a diffuser flow path, the diffuser flow path being an annular space formed between the diffuser inner tube and the diffuser outer tube, and which divides the diffuser flow path in a circumferential direction,
   wherein the plurality of partition members are disposed radially inward of the combustor, and
   wherein each of the plurality of partition members has a shape wherein a circumferential dimension thereof gradually and continuously increases from an upmost upstream side toward a most downstream side in a flow direction of the compressed gas.

2. The gas turbine engine as claimed in claim 1, wherein an aspect ratio H/W, of a height dimension H relative to a width dimension W of a flow-path cross section of each of divided diffuser flow paths which are formed by dividing the diffuser flow path with the plurality of partition members, is larger at an outlet of the divided diffuser flow paths than at an inlet of the divided diffuser flow paths, and the aspect ratio H/W of the flow-path cross section of each of the divided diffuser flow paths at the outlet of the divided diffuser flow paths is within a range of 0.3 to 5.

3. The gas turbine engine as claimed in claim 2, wherein the aspect ratio H/W of the flow-path cross section of each of the divided diffuser flow paths at the outlet of the divided diffuser flow paths is 1.

4. The gas turbine engine as claimed in claim 1, further comprising a plurality of connection columns that connect the diffuser outer tube to the diffuser inner tube, wherein the plurality of connection columns are disposed at circumferential positions corresponding with circumferential positions of the plurality of partition members.

5. The gas turbine engine as claimed in claim 1, wherein a plurality of N combustors are disposed in the circumferential direction, the number of the plurality of partition members is n, and N/n is a natural number.

6. The gas turbine engine as claimed in claim 1, wherein a length of each of the plurality of partition members in a flow direction of the compressed gas is equal to or greater than 10% of the length of the diffuser in the flow direction of the compressed gas.

7. The gas turbine engine as claimed in claim 1, wherein the combustor includes a transition duct configured to lead the combustion gas to the turbine and having a transition duct body and a duct cover that covers the transition duct body, the duct cover having multiple air introduction holes, and
   each partition member of the plurality of partition members is disposed at a position radially inward of the transition duct such that the transition duct and each partition member of the plurality of partition members circumferentially and axially overlap each other.

8. The gas turbine engine as claimed in claim 1, wherein each partition member of the plurality of partition members is provided so as to extend over the entire length of the diffuser.

9. The gas turbine engine as claimed in claim 1, wherein each partition member of the plurality of partition members has a flat surface on the most downstream side.

* * * * *